United States Patent [19]

Blodgett, Jr. et al.

[11] 4,227,713
[45] Oct. 14, 1980

[54] TRAILER HITCH LATCHING ASSEMBLY

[76] Inventors: Raymond W. Blodgett, Jr.; Raymond W. Blodgett, both of 10961 Huber St., Anaheim, Calif. 92804

[21] Appl. No.: 19,830

[22] Filed: Mar. 12, 1979

[51] Int. Cl.³ .............................................. B62D 53/12
[52] U.S. Cl. ..................................... 280/434; 280/508
[58] Field of Search ............... 280/434, 437, 508, 433, 280/423 R

[56] References Cited
U.S. PATENT DOCUMENTS

| | | | |
|---|---|---|---|
| 2,371,750 | 3/1945 | Fontaine | 280/434 |
| 3,600,006 | 6/1969 | Slaven | 280/434 |
| 3,811,706 | 5/1974 | Tucker et al. | 280/434 |

*Primary Examiner*—John J. Love
*Assistant Examiner*—Donn McGiehan
*Attorney, Agent, or Firm*—Jack C. Munro

[57] ABSTRACT

A trailer hitch latching assembly which employs the use of a housing which has an access opening to accommodate a trailer hitch. Extending across the opening and attached to the housing and pivotly attached to the housing is a latch plate. The latch plate is to be contacted by the trailer hitch and is to be movable to a rear position. With the latch plate in the rear position, a locking pawl is caused to slide across the forward portion of the opening thereby connecting the trailer hitch to the housing. The locking pawl is to be moved between the retracted and extended position by means of a manually operable gear assembly.

5 Claims, 5 Drawing Figures

TRAILER HITCH LATCHING ASSEMBLY

BACKGROUND OF THE INVENTION

The field of this invention relates to a trailer hitch assembly for the towing of a trailer and more particularly to a trailer hitch which is especially adapted to be mounted on the back of a pickup truck close to and located between the rear wheel wells of the truck so that the pickup truck can be used for pulling the trailer.

It has been known to employ the use of a pickup truck to haul a trailer. The most common way is to mount a trailer hitch onto the back bumper of the pickup truck which is then used to haul the trailer. However, with this type of conventional trailer hitch, the gate is not considered safe or feasible to haul a large sized trailer. Therefore, larger sized trailers such as travel trailers cannot be safely hauled in this conventional manner.

It has been also known to locate a trailer hitch latching assembly within the bed of the pickup truck. This trailer hitch latching assembly is to connect with the trailer hitch on the foreward portion of a travel trailer and the resulting combination of truck and trailer has been shortened and the weight more evenly distributed which therefore makes the connection between the truck and the trailer more safe.

The previous trailer hitch latching assembly used within the bed of a pickup truck employs a pair of movable jaws which separate to accommodate the trailer hitch and which would then close together to lock the trailer hitch in position. However, on a rare occasion, it has been known that a trailer hitch could become disengaged from this type of latching assembly. It would be desirable to construct a latching assembly which absolutely precluded any possibility of accidental disengagement of the trailer hitch as obviously a unattached trailer on a roadway is extremely hazardous.

SUMMARY OF THE INVENTION

The structure of this invention is summarily described in the Abstract of the Disclosure and reference is to be had thereto.

The primary objective of this invention is to construct a trailer hitch latching assembly to employ in conjunction with the bed of a pickup truck wherein the latching assembly is positive in its operation and when the trailer hitch is latched absolutely prevents accidental disengagement of the trailer hitch from the latching assembly.

Another objective of this invention is to construct a trailer hitch latching assembly which is constructed of few parts which can be assembled easily and quickly thereby minimizing manufacturing expense.

DETAILED DESCRIPTION OF THE SHOWN EMBODIMENT

Figure 1:
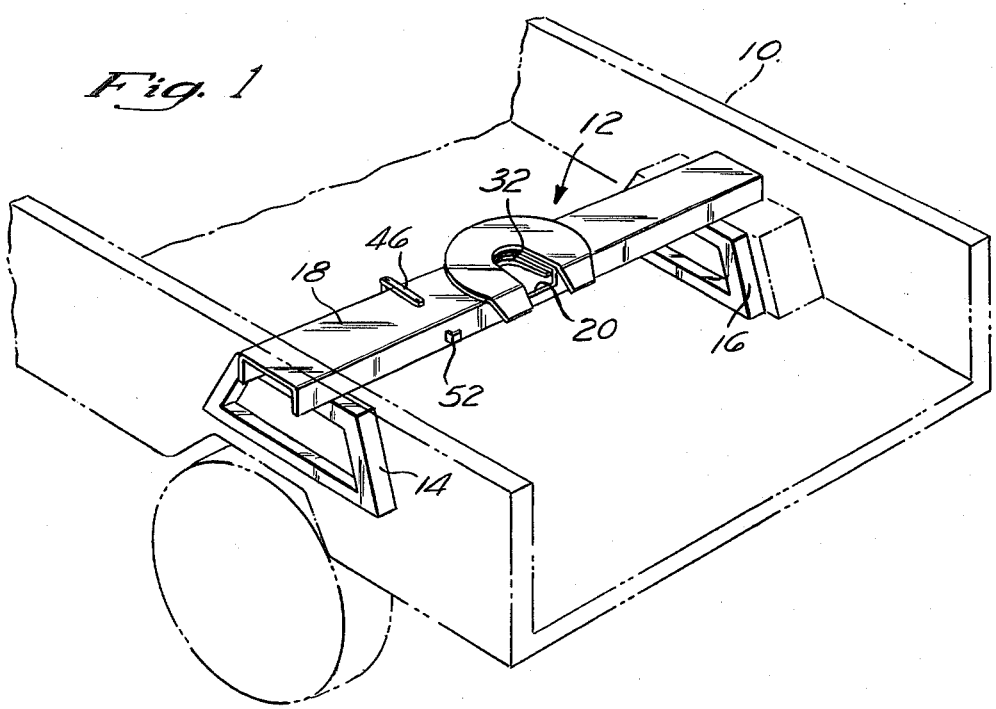
FIG. 1 is an isometric view of the trailer hitch latching assembly of this invention showing the locating of such within the bed of a conventional pcikup truck.

Referring particularly to the drawings there is shown in FIG. 1 a pickup truck body 10 which has a load carrying bed within which is supported the trailer hitch latching assembly 12 of this invention. The trailer hitch latching assembly 12 includes mounting side rails 14 and 16 which are employed to secure the latching assembly 12 to the pickup truck body 10. This securing of the latching assembly 12 to the pickup truck body 10 is deemed to be conventional and forms no specific part of this invention.

The latching assembly 12 of this invention has a channel shaped (in cross-section) housing 18. Located through the wall of the channel shaped housing 18 is an opening 20. The opening 20 is located at approximately the longitudinal center of the housing 18.

Secured interiorly of the housing 18 and located between the spaced apart legs of the housing 18 is a pair of metallic strips 22 and 24. The strip 22 is located on one side of the opening 20 with the strip 24 located on the opposite side of the opening 20. The strips 22 and 24 are to function as a support for the latch plate 26. The latch plate 26 is pivotly attached through a pin 28 to the strip 24. The pin 28 is also pivotly mounted within an upper plate 30. The upper plate 30 includes an opening essentially similar in size to the opening 20 and is located in alignment with the opening 20. The plate 30 is mounted directly adjacent the upper surface of the housing 18 but functioning to space the latch plate 26 a predetermined distance from housing 18.

The latch plate 26 includes a cavity 32. The cavity 32 is shaped to receive the cylindrical shaped trailer hitch member 34. It is to be understood that the trailer hitch 34 is to be attached to a separate trailer structure not shown.

Figure 2:
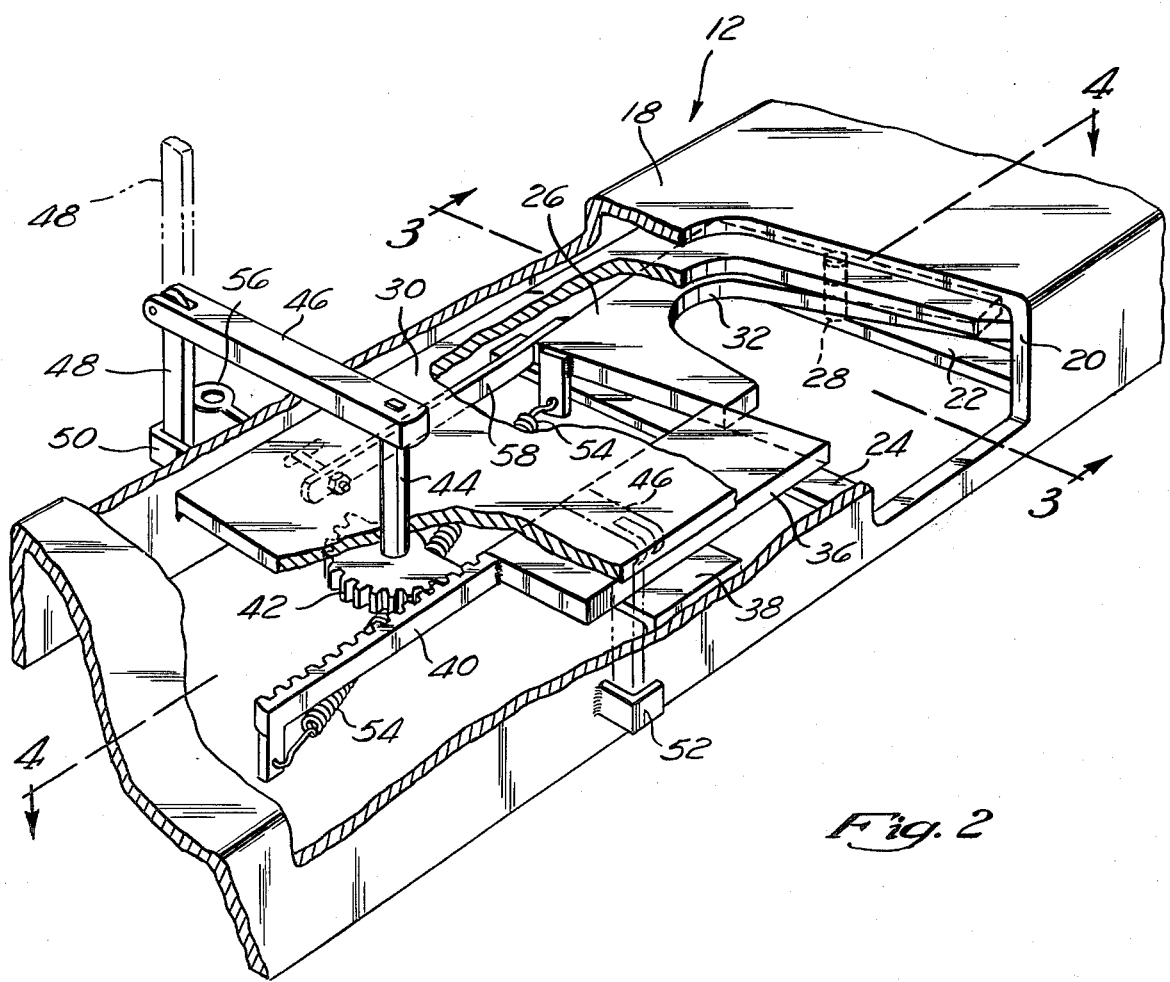
FIG. 2 is an enlarged, broken away, isometric view of a trailer hitch and latching assembly of this invention.
Figure 3:
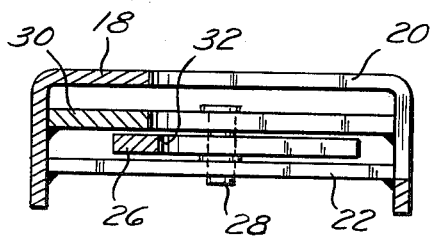
FIG. 3 is a cross-sectional view through the trailer hitch receiving opening taken along line 3—3 of FIG. 2.
Figure 4:
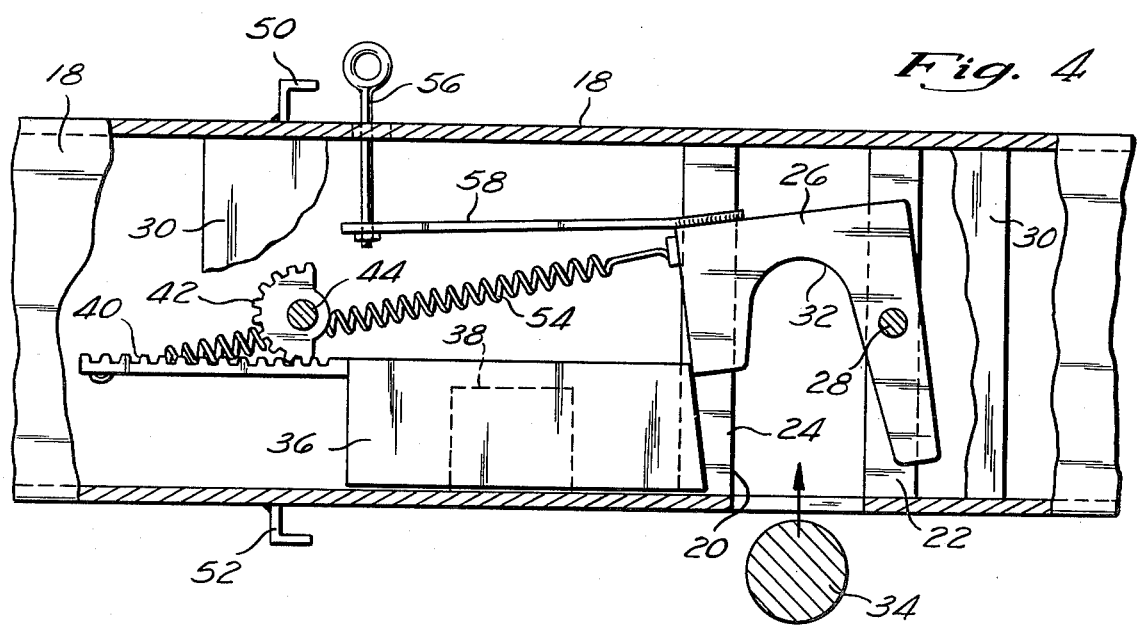
FIG. 4 is a longitudinal cross-sectional view taken along line 4—4 of FIG. 2 showing the latching assembly in a position about ready to receive the trailer hitch assembly.
Figure 5:
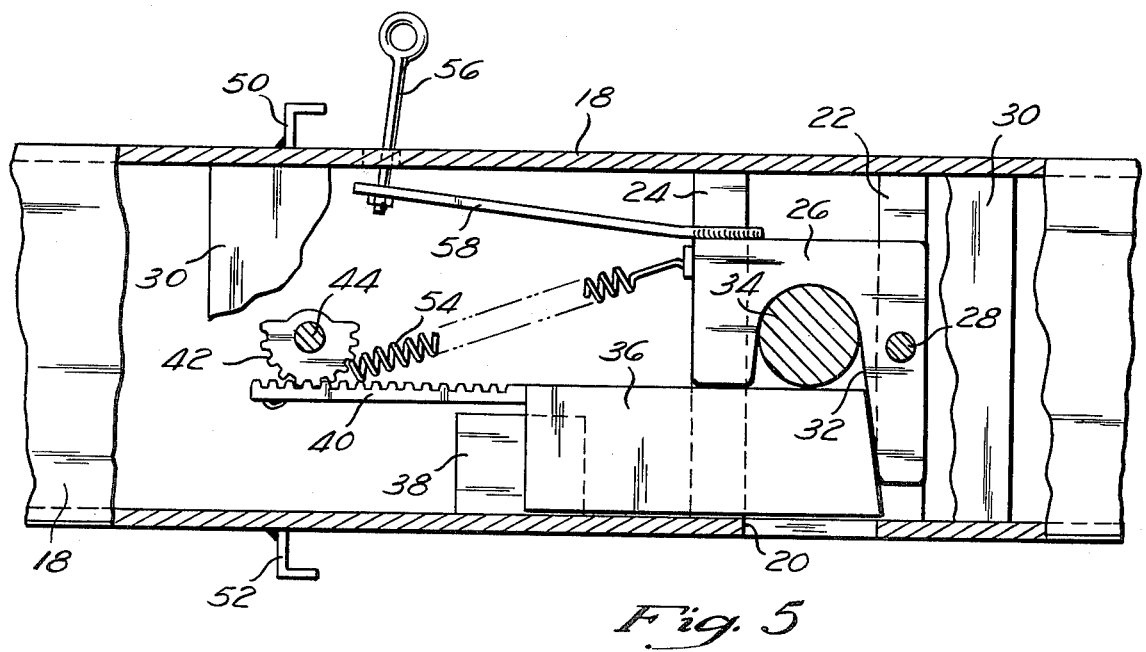
FIG. 5 is a view similar to FIG. 4 but showing the trailer hitch in the latched position.

Resting on the strip 24 is a locking pawl 36. The locking pawl 36 is to also rest on top of a supporting plate 38 which in turn is fixedly secured to the housing 18. A small portion of the forward edge of the locking pawl 36 is to be capable of abutting against the latch plate 26 as shown in FIGS. 2 and 4 of the drawings. In this position the locking pawl 36 is held in a retracted position and movement to the extended position (shown in FIG. 5) is not permitted. With the locking pawl 36 in the extended position, the cavity 32 is then closed thereby captivating the trailer hitch member 34.

Integrally secured to the rear end of the locking pawl 36 is a gear toothed rach 40. The rack 40 is to be in engagement with a drive gear 42. The drive gear 42 supported upon a shaft 44. The shaft 44 passes through plate 30 in the housing 18 and connects with a handle 46. The outer portion of the handle 46 includes a hanged section 48. The hinged section 48 is capable of connecting with outwardly extending bracket 50 located on the exterior surface of one side of the housing 18, or capable of cooperating with outwardly extending bracket 52 mounted on the opposite side of the housing 18. The function of the brackets 50 and 52 will be explained further on in this specification.

Attached to the outer end of the gear rack 40 is one end of a coil spring 54. The coil spring 54 is also secured to the aft end of the latch plate 26. As a result, this spring 54 functions to exert a continuous bias against the latch plate 26 tending to locate such in the position shown in FIGS. 2 and 4 of the drawings. However, if the latch plate 26 is struck by the trailer hitch 34 upon such being conducted into the opening 20, the latch plate 26 picots about the pivot pin 28 until such becomes free of the pawl 36. The bias of the spring 54 will cause the locking pawl 36 to move to the extended position thereby enclosing the trailer hitch 34. It is to be noted that this movement of the locking pawl 36 can only be accomplished when the outer section 48 of the handle 46 is pivoted in respect thereto so as to be disengaged from the bracket 50. Upon the locking pawl 36 being moved to the extended position, due to engagement between the gear rack 40 and the gear rack 42, the handle 46 pivots one hundred and eighty degrees and can be locked in this position with the extended portion 48 being engaged with the bracket 52. This functions as a safety lock to maintain the locking pawl 36 in the extended position.

It is to be understood that when it is desired to move the locking pawl 36 to the retracted position that the operator only need to disengage the portion 48 from the bracket 52 and manually pivot the handle 46 one hundred and eighty degrees until the locking pawl 36 moves free of the latching plate 26. At this time the bias of the spring 54 will cause the latching plate 26 to pivot slightly until it comes into abutting contact with the foreward edge of the locking pawl 36. This then prevents movement of the locking pawl 36 to the extended position.

At times it may be desirable to manually pivot the latch plate 26 so as to permit the locking pawl 36 to move to the extended position. In order to achieve this end result, the operator only need to pull outwardly on the handle 56 which is conducted through an opening in the housing 18 and is attached to a plate 58. The plate 58 is in turn secured to the aft edge of the latch plate 26 so therefore, by the outward movement by the handle 56, causes the latch plate 26 to pivot so as to become free of the locking pawl 36.

What is claimed is:

1. A trailer hitch latching assembly comprising:
    a housing;
    an opening located within said housing, said opening to accommodate a trailer hitch;
    a locking pawl attached to said housing and located within said opening, said locking pawl being movable between a retracted position exterior of said opening to an extended position across said opening;
    a latch plate mounted on said housing and across said opening, said latch plate being movable between a first position and a second position, said first position engaging said locking pawl and preventing movement of such to said extended position, said second position disengaging said locking pawl permitting such to move to said extended position forming a totally enclosed area between said latch plate and said locking pawl, said trailer hitch to be located within said enclosed area;
    a coil spring connected between said locking pawl and said latch plate, said locking pawl being continuously biased toward said extended position by said coil spring and said latch plate is continuously biased toward said first position, whereby the biasing force of said coil spring tends to maintain said latch plate in said first position and engaging said locking pawl, and when said latch plate is in said second position the biasing force of the coil spring tends to maintain said locking pawl and said latch plate in the position defining said totally enclosed area; and
    means connectable to said latch plate for moving such between said first and said second positions.

2. The trailer hitch latching assembly as defined in claim 2 wherein:
    said latch plate being pivotly mounted upon said housing.

3. The trailer hitch latching assembly as defined in claim 2 wherein:
    said locking pawl being attached to a gear rack, a driving gear engaging said gear rack, said driving gear geing rotatably mounted by a shaft on said housing, said shaft being attached to a handle, by manual operation of said handle said driving gear through said gear rack causes said locking pawl to be moved to said retracted position.

4. The trailer hitch latching assembly as defined in claim 3 wherein:
    said means comprising said trailer hitch, upon location of said trailer hitch within said opening the said latch plate is moved to said second position thereby permitting movement of said locking pawl to said extended position.

5. The trailer hitch latching assembly as defined in claim 4 wherein:
    said means further includes a separate manually operated lever, said manually operated lever effecting movement of said latch plate to said second position.

* * * * *